INVENTOR.
DALLAS V. FRANKE
BY
Lyon & Lyon
ATTORNEYS

United States Patent Office 2,741,761
Patented Apr. 10, 1956

2,741,761

MEANS AND TECHNIQUES FOR PRODUCING VISIBLE DISPLAY OF IDEAL FLIGHT PATH

Dallas Valo Franke, Redondo Beach, Calif., assignor to Gilfillan Bros. Inc., Los Angeles, Calif., a corporation of California Application January 11, 1952, Serial No. 266,002

6 Claims. (Cl. 343—11)

The present invention relates to improved means and techniques for producing electronically certain indicia on the face of a cathode ray tube and more specifically relates to improved means and techniques for producing a visual display of a glidepath and course line in an azimuth-elevation display used in present ground control approach (GCA) equipment.

It is desirable, for reference purposes, in GCA systems, to provide a visual representation of a predetermined flight path for aircraft flying through an approach zone to an aircraft landing field up to the point of touchdown.

In GCA systems, two antenna beams are used, one scanning in the horizontal or azimuth plane, and the second antenna beam scanning on a time-sharing basis with the first antenna beam, in the elevation plane. Correspondingly, two displays are produced, on a time-sharing basis, on the face of a single cathode ray tube, i. e., an elevation versus range display and also an azimuth versus range display is presented on the face of the same cathode ray tube. The desired flight path for the aircraft is visually indicated in both azimuth and elevation displays as lines, such lines in fact, constitute a series of intensified dots.

The predetermined flight path in the azimuth display is commonly referred to as the course line; and such flight path in the elevation display is commonly referred to as the glidepath.

In the earlier GCA systems, such glidepath and course lines are in the form of overlays, placed mechanically on the outside viewing face of the cathode ray tube.

In later GCA systems such glidepath and course lines are produced electronically, using the means and techniques described and claimed in the copending application of David J. Green, et al., Serial No. 222,511, filed April 23, 1951. Electronic means for producing glidepath and course line is commonly referred to as a cursor generator.

The present invention contemplates a cursor generator which is considered to be an improvement of the cursor generator described and claimed in the aforementioned application of David J. Green, et al., and contemplates the use of non-linear parameters such as thyrite in a zero seeking loop.

It is further an object of the present invention to provide improved means and techniques whereby certain indicia is visually presented on the face of a cathode ray tube and more specifically to an improved cursor generator for visually producing a predetermined glidepath and course line in a GCA system display.

A specific object of the present invention is to provide cursor generator characterized by its simplicity, flexibility, ease of adjustment and relatively few circuit elements.

Another specific object of the present invention is to provide an improved cursor generator utilizing thyrite in a zero seeking loop.

Another specific object of the present invention is to provide an improved cursor generator utilizing the characteristics of non-linear parameters such as thyrite, to develop range voltages which are applied to a multi-vibrator for producing correspondingly delayed pips for cathode ray tube presentation.

Another specific object of the present invention is to provide an improved cursor generator to which is fed radar system triggers and a voltage representing the instantaneous position of the antenna beam, azimuth or elevation, as the case may be, in its scanning function, the cursor generator receiving such data and automatically producing a series of pips, such pips being applied to an intensity control cathode ray tube to produce the aforementioned glidepath and course line.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figures 1, 2, 3, 4, 5:
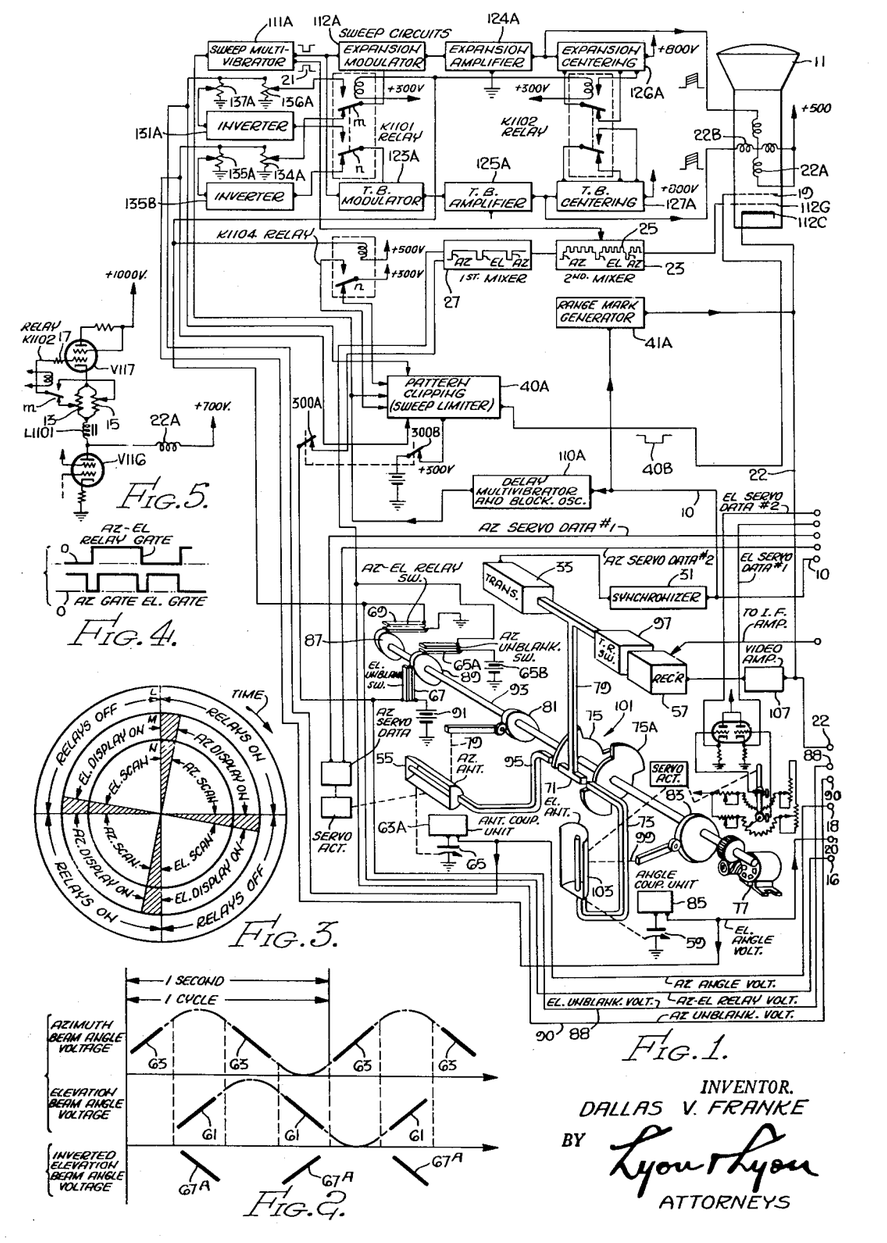
Figure 1 shows in schematic form apparatus for scanning the approach zone to an aircraft landing field with related circuitry for producing a visual indication of the character illustrated in Figure 6.
Figure 2 shows azimuth, beam angle voltage, elevation beam angle voltage, as well as inverted elevation beam angle voltage and their variations with respect to time as developed by the apparatus shown in Figure 1.
Figure 3 shows a cycle of operation of the radar scanning and indicating arrangements in Figure 1 and serves to illustrate the period during which the az.-el. relay voltage is available.
Figure 4 illustrates other voltages developed during cyclical operation of the apparatus illustrated in Figure 1.
Figure 5 illustrates more detail of the cathode beam centering means shown in block form in Figure 1. Such circuitry being effective to shift the displays in Figure 6 sequentially from one origin position O-1 to the other origin position O-2 and from O-2 to O-1, etc.

The cursor generator embodying features of the present invention is indicated as such in the system illustrated in Figure 1, and, as observed therein, receives system triggers and antenna beam angle voltage for producing a series of pips which are applied to an intensity control electrode of the cathode ray tube 11.

The overall system shown in Figure 1 is first described under the following heading: "Means Shown in Figures 1–5 for Producing Information Useful in Producing Visual Indications," and details of the cursor generator embodying important features of the present invention are described more specifically in connection with Figures 9 and 10, which figures illustrate the circuitry of the cursor generator.

*Means shown in Figures 1–5 for producing information useful in producing visual indications*

Figure 6:
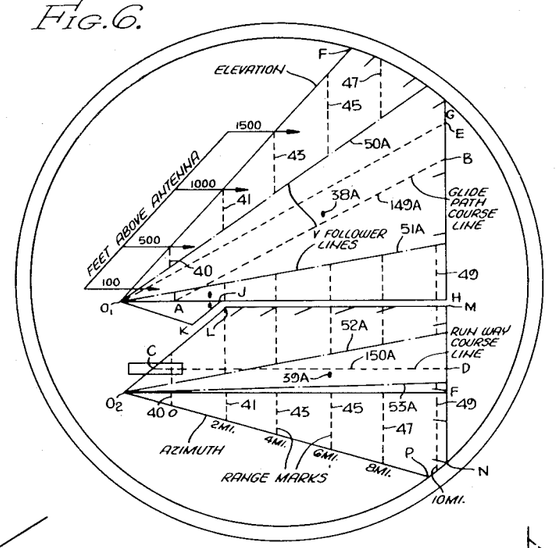
Figure 6 illustrates the display obtained using the apparatus illustrated in Figure 1, the elevation and azimuth displays being produced sequentially on a time-sharing basis.

The apparatus shown in Figure 1 is connected both to the apparatus shown therein for producing visual indications on the face of the cathode ray tube 11 of the character shown in Figure 6.

In Figure 1, the synchronizer 31 serves to generate timing pulses which are used to time the application of pulses to the transmitter 33 to initiate its operation. The transmitter stage 33, pulsed at a constant repetition rate of, for example, 2000 or 5500 pulses per second consists of, for example, a magnetron oscillator with a characteristic frequency of about 10,000 megacycles. The output of the transmitter stage 33 is transferred to either the elevation (el.) antenna 103 or the azimuth (az.) antenna 55, depending upon the position of the motor driven interrupter or radio frequency switch 101. The transmit-receive (T–R) switch 97 prevents power from the transmitter 33 from being applied directly to the receiver 57. This transmit-receive switch 97, as is well known in the art, allows low intensity signals, such as a train of resulting echo signals received on the antennas 103, 55, to be transferred to the input terminals of the receiver 57. This deflection of energy from the transmitter 33 to the antennas 55, 103, accomplished by operation of switch 101, occurs at a rate of approximately two per second so that in effect the component antennas obtain four "looks" per second of the space scanned.

The resulting antenna beams are caused to move angularly, i. e., to scan upon rotation of the shaft 93. The switch 101 is rotated twice per second, and while energy is being transmitted to one of the antennas 55, 103, the resulting electromagnetic beam projected into space is caused to scan such space. The means whereby such scanning movement of the projected electromagnetic beam is obtained may be of the type described in the copending application of Karl A. Allebach, Serial No. 49,910, filed September 18, 1948, now Patent No. 2,596,113, for bridge type precision antenna structure, which depends for its operation on the use of a variable wave guide type of antenna. This particular means, per se, forms no part of the present invention, and so far as the aspects of the present invention are concerned the antenna scanning beam may be produced by moving the entire antenna through a relatively small arc of a circle. Actually, in fact the azimuth antenna beam may scan first in one direction and then in the other, waiting after each scan while the elevation beam completes a scan in elevation. The azimuth antenna 55 scans a fixed horizontal angle of 20°, and is so placed as to include the approach course to a given airfield runway. Vertical scan of the elevation antenna 103 is from minus one degree to plus 6 degrees.

While in any position during the part of the cycle in which the relay frequency switch 101 allows the flow of energy into the elevation antenna 103, the elevation antenna beam is electrically scanned in elevation. The position of the elevation antenna beam is measured by means of a variable capacitor 59, one plate of which is attached to the beam scanner of elevation antenna 103 and varied in accordance therewith, such capacitor 59 comprising one part of a capacitive potentiometer and contained in the angle coupling unit 85 which may be of the type described and claimed in the copending patent application of Clarence V. Crane, Serial No. 212,114, filed February 21, 1951, now Patent No. 2,650,358. The angle coupling unit 85 thus used with capacitor 59 is useful in developing the elevation beam voltage represented as 61 in Figure 2.

Similarly, the angle in azimuth of the radiated azimuth antenna beam is measured by the angle capacitor 65 in the azimuth angle coupling unit 63A, operating synchronously with the scanner of the azimuth antenna 55. Such variation in azimuth angle voltage as a function of the particular angular position of the azimuth antenna beam is represented by cyclically varying voltage 63 shown in Figure 2. It is observed that these voltage variations Nos. 61 and 63, have portions thereof shown in heavy lines, and it is these portions which are used to effect control operations and which are selected by means mentioned later. Figure 2 also shows inverted azimuth elevation beam angle voltage as represented by the oblique lines 67.

Also coupled to the scanner of the elevation antenna 103 is the elevation unblanking switch 67, which has one of its terminals connected to the continuous voltage source 91 for purposes of developing an elevation unblanking voltage gate, shown in Figure 4, so timed that its positive value corresponds to the time of effective scanning of the elevation antenna beam. The azimuth unblanking switch 65A is similarly coupled to the scanner of azimuth antenna 55 with one of its terminals connected to the continuous voltage source 65B for purposes of developing azimuth unblanking voltage (Fig. 4) so timed that the positive portions of such voltage corresponds to the time of effective scanning of the azimuth antenna beam. Relay switch 69 operates at substantially the same time as switch 65A, and synchronously therewith and serves to generate the so-called az.-el. relay voltage or gate (Fig. 4), which is so timed that its positive portion begins at a time just prior to the beginning of the azimuth unblanking voltage and just after the end of elevation unblanking voltage, and which ends at a time just after the ending of the azimuth unblanking voltage and just prior to the beginning of the elevation unblanking voltage, all as seen in Figure 4.

Figure 3 shows a schematic diagram of the time relations involved in a scanning action which, typically, occupies a time in the order of one second. Forward progress of time is represented by clockwise motion about this diagram. The central circular region of Figure 3 marked N shows the time schedule of the scanning operations of the two systems, opposite quadratures being scanned by the same system but carried out in opposite directions. The shaded areas (each comprising approximately 10 degrees of the complete 360 degree cycle) represent the periods during which the transmitter 33 is switched by the switch 101 in Figure 1 from one antenna to the other antenna. Unshaded areas of region N represent the time periods during which one or the other of the antennas is in use, sending out radio frequency pulses and received reflected echo signals from objects within the field of coverage of the beam. Shaded areas indicate inactive periods during which switching takes place, both antennas being momentarily isolated from the transmitter and receiver.

The inner annular region M of Figure 3 represents the time schedule of the related azimuth and elevation displays, subject however to pattern clipping described later, and corresponds to the cyclical variations of azimuth and elevation voltages represented in Figure 2.

The outer annular region of Figure 3, marked L, shows the time schedule of currents through the various coils of a number of so-called az.-el. switching relays for effecting time sharing. The relay actuating current is obtained by the switch 69 (Fig. 2) operating in synchronism with the mechanism producing azimuth antenna beam scanning.

More specifically, in Figure 1, the wave guide transmission line 79 leads from the transmitter 33 and receiving system 97, 57. A T-joint 71 divides this transmission line into two branches 73 and 95, leading through switch assembly 101 to the elevation and azimuth assemblies 103 and 55, respectively. These branches have suitably placed shutter slots which receive the rotating shutters 75 and 75A, respectively. These are mounted on the common drive shaft 93, driven by the motor 77, and have two blades each arranged in opposite fashion, so that when one antenna transmission branch is opened, the other will be blocked by its shutter. The shutter blades cover angles of approximately 100 degrees, leaving openings of 80 degrees as required by region N of Figure 3.

As mentioned previously, the same drive shaft 93 operates the two antenna beam scanning mechanisms represented by the dotted lines 99, 79, and assumed to be of the same construction as the above mentioned Allebach application and built into the antenna assemblies. In the showing of Figure 1, the eccentric cams 83, 81 on shaft 93 operate the same scanning mechanism. Since each of the cams 83, 31 has one lobe, while its associated shutter 75A or 75 has two lobes, one opening in the shutter will find the antenna scanning in one direction, the other in the opposite direction. The azimuth and elevation unblanking switches 75A and 67 are shown schematically in Figure 1 as being cam actuated, being operated by the two-lobed cam 89, for purposes of establishing the unblanking or intensifying voltages represented in Figure 4.

The az.-el. relay switch 69 is operated by the cam 87 on shaft 93 to control current to the circuit switching relays, the junction of which is described hereinafter.

Figure 7:
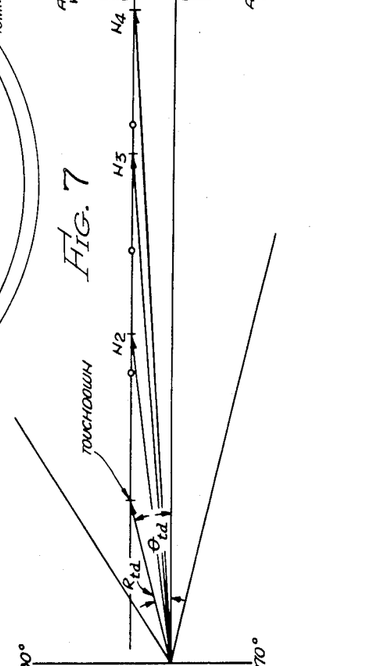
Figure 7 illustrates the geometrical conditions existing in the azimuth plane, with the radar equipment located adjacent the runway center line and in relationship to the touchdown point, such figure being useful in appreciating the requirement for non-linear operation of the zero seeking loop.

Radar echo signals, when received at the elevation antenna 103 or the azimuth antenna 55, as the case may be, is fed back into the switch 101 and passed through the T-R switch 97 into the receiver 57. Receiver 57 serves to detect the video and after the video is amplified in the video amplifier stage 107, it is applied as so-called normal video to the correspondingly designated leads 22 in both Figures 2 and 7. Such video, i. e., radar video, derived from echo signals may be applied directly to the cathode of the cathode ray tube 11 shown in Figure 1 for purposes of producing visual indications; or, such normal video may first be "standardized" by applying the same to the video shaper indicated as such in the block diagram shown in Figure 7 and described in greater detail with respect to Figure 8. It is understood that other means may be used for applying the video to an intensity control electrode of a cathode ray tube and by, for example, the means and techniques described and claimed in the copending application of Landee et al., Serial No. 247,616 filed September 21, 1951, and assigned to the same assignee, may be used for this purpose.

The cathode ray tube 11 in Figure 1 has a pair of magnetic deflection coils 22B, 22A, so arranged as to deflect the associated electronic beam substantially parallel to two mutually perpendicular axes, i. e., the so-called "time base" axis which is generally, although not exactly horizontal as viewed by the operator, and the so-called "expansion" axis which is generally vertical. In general, each basic trigger pulse developed in synchronizer 31 (Fig. 2) is made to initiate a current wave of sawtooth form through the time base deflection coil 22B and a current wave of similar form through the associated expansion deflection coil 22A, the current in each coil expanding approximately linearly with time and then returning rapidly to zero. Instead of a linear variation this variation may be logarithmic in character as described in the above mentioned Homer G. Tasker application, Serial No. 175,168, filed July 21, 1950, and assigned to the same assignee as the present application.

The resulting rate of such sawtoothed current is of course the same as, or a fractional multiple of, the pulse repetition rate of the transmitted radar pulses and occur during the expectant period of resulting echo signals. It will be understood that electrostatic deflection of the cathode ray beam may be used instead of electromagnetic deflection, appropriate modification being made in other parts of the equipment.

Such sawtooth currents applied to the deflection coils 22B, 22A, however, are "modulated" at a much lower rate by currents of much lower periodicity which are produced by the aforementioned beam angle voltages shown in Figure 2. Those portions of the voltage indicated in heavy lines in Figure 2 only are used to modulate the voltages on a time sharing basis.

These voltages as represented by the curves 61, 63, may vary from plus 2 volts at one extreme of the scanning range to plus 52 volts at the other end. These particular antenna beam angle voltages as mentioned previously are used in effect to "modulate" an amplitude of the sawtooth voltage waves developed at the sweep amplifier shown in Figure 2 and applied at a much higher repetition rate to the expansion coil 22A, for purposes of obtaining so-called unidirectional or unidimensional magnitudes in the cathode ray display, in accordance with the principles set forth in the copending application of Homer G. Tasker, Serial No. 680,604, filed July 1, 1946, and assigned to the same assignee as the present application. On the other hand, the amplitude of the sawtooth voltage waves developed at the sweep amplifier and applied to the other quadraturely acting timing based coil 22B is likewise modulated to a much smaller degree and in a different manner, for purposes of orientation. Thus the amplitude of the currents applied to coil 22A is automatically varied in accordance with antenna beam angle voltage, so that the angle which any particular cathode ray beam makes, corresponds, on an expanded scale, to the antenna beam voltage.

The tube 11 is rendered fully operative for producing visible indications only when a suitable intensifying voltage is applied to its grid 112G, bringing the tube approximately to cut off condition. A relatively small additional video signal applied to the cathode 112C then strengthens the cathode beam, making it momentarily visible on the screen as a dot, the position of which is determined by the currents flowing at that particular moment in the set of deflection coils 22A, 22B.

For purposes of developing the aforementioned suitable deflecting currents in the cathode ray deflection coils 22A, 22B, the sweep generating circuit shown in Figure 1 is applied with basic triggers originating in the synchronizer 31 and applied to lead 10. Such trigger is applied to the delay multivibrator and blocking oscillator stage 110A, the output of which is fed to the sweep generating multivibrator stage 111A. A negative gating voltage is generated in the stage 111A and fed to the expansion and time base modulator stages 112A, 123A, respectively, and from them in modulated form through the expansion and time base amplifiers 124A, 125A. The output of the amplifiers 124A, 125A in the form of essentially trapezoidal waves of appropriate amplitude are applied to the expansion deflection coil 22A and the time base deflection coil 22B, respectively, causing current pulses of substantially linear sawtooth form in the coils. Expansion and time base centering circuits 126A, 127A, are also connected to the deflection coils. The modulator stages 112A, 123A, for purposes of modulation receive az.-el. antenna beam angle voltages via switches m and n, respectively, of relay K1101.

With the relay unactuated (as shown) the elevation beam angle voltage appearing on the potentiometer resistance 134A is applied through switch m to the expansion modulator 122A; and through potentiometer resistance 135A and inverter 135B and switch n to the time base modulator 123A. After completion of the elevation scan relay K1101 is energized through switch 69 breaking the elevation beam angle voltage connections just described, and connecting the azimuth beam angle voltage through potentiometer 136A and switch m to the expansion modulator 122A; and through potentiometer 137A, inverter 131A and switch n to the time base modulator 123A.

Thus the degree of modulation of sweep current, and hence the degree of angle expansion of the display shown in Figure 6 may be separately regulated for the azimuth display by adjustment of the potentiometer 134A, and for the elevation display by adjustment of the potentiometer 134A; and the degree of modulation of the time base sweep current, and hence the apparent angle between the range marks and the time base may be separately regulated for the azimuth display by adjustment of potentiometer 137A, and for the elevation display by adjustment of the potentiometer 135A.

The centering circuits 126A, 127A in Figure 1, are individually capable of two separate adjustments, one effective when relay K1102 is actuated (azimuth display) and one when the relay is unactuated (elevation display) to determine the position of the points $O_2$, $O_1$, respectively, in Figure 6. Thus the origins of azimuth and elevation displays are separately adjustable, the centering circuits automatically responding to one or the other set of adjustments according to the energizing condition of relay K1102. A schematic diagram showing a centering circuit for this purpose is shown in Figure 5.

The deflection coil 22A in Figure 5 is connected between a 700 volt positive supplying and two parallel circuits, one leading to ground through tube V–1116, which is the final stage of expansion amplifier 124A, and the other returning through choke coil L1101 and centering tube V–1117 to a 1,000-volt positive supply. The first of these two circuits feeds to deflection coil 22A, the periodically varying sweep producing component, while the second circuit provides a relatively constant but adjustable centering current component. The cathode resistor of centering tube V–1117 is made up of two parallel connected potentiometers 13 and 15, the movable contacts of which are connected respectively to the normally closed and normally open contacts of switch $m$ of relay K1102. A switch arm is connected through grid resistor 17 to the tube grid. The grid bias, and hence the centering current through the tube and through the coil 22A thus depends upon the position of relay switch $m$ and is determined by the setting of the potentiometer 15 when relay K1102 is actuated (azimuth display) and by the potentiometer 13 when the relay is not actuated (elevation display). The two displays are therefore separately adjustable as to the vertical position, expansion component, on the indicator tube by means of the two potentiometers.

The time base deflection coil 22B is provided with centering circuit which is identical to that in Figure 5 and functions in a like manner, controlled by switch $n$ of relay K1102. In fact, by appropriate changes of the numerals and lettering Figure 5 may be considered to illustrate the time base centering circuit. The potentiometers then provide separately adjusted ordinary elevation and azimuth displays with respect to the horizontal positions.

It is noted that the preferred interrelationship of the two displays in Figure 6 is such that the series of corresponding range marks of the two patterns lie in a straight line so that the two aircraft images 38A, 39A always lie in a line just parallel to the range mark lines, one directly above the other.

The azimuth and elevation display shown in Figure 6 are limited so that they appear as shown, such pattern clipping or limiting being produced by operation of the pattern clipper or limiter 40A shown in Figure 1. Such sweep limiter 40A forms, per se, no part of the present invention and may be the one described and claimed in the copending patent application of Raymond B. Tasker, Serial No. 212,163, filed February 21, 1951, now Patent No. 2,663,868, and assigned to the same assignee. In general, the output of sweep limiter stage 40A is a negative-going gating voltage 40B applied to the first anode 19 of the cathode ray tube 11. Such negative-going gating voltage 40B is used for darkening, i. e., blanking out, the indications which may be otherwise visible. Such blanking occurs during undesired periods of sweep as now described specifically.

The azimuth display, which is preferably the lower one, is blanked or clipped or limited, above a horizontal line LM which extends parallel to the runway axis 150A and at a sufficient distance above it to allow for expected errors in the azimuth angle of approaching aircraft. In the elevation (upper) display, a section is cut out or clipped, such section being below the horizontal runway axis $O_1G$ and to the right of a short generally vertical line KJ. This line KJ is located just to the left of and parallel to the upper limiting sweep path $O_2L$ of the lower azimuth display. The region thus eliminated from the elevation display corresponds to space below the runway level.

As shown in Figure 1, input to the sweep limiter 40A is: (1) a trigger derived from the basic trigger appearing on lead 10; (2) the azimuth and elevation angle coupling voltages on leads 18 and 20 respectively; and (3) the az.-el. relay voltage on lead 16. It is understood that this negative gating voltage 40B appears at variable times along the time axis depending upon the magnitude of either the azimuth or elevation beam angle voltage, whichever one at that particular time is effective.

The purpose of the switches 300A, 300B shown in Figure 1 are fully described in the above mentioned application of Homer G. Tasker and for the present instance may be considered to remain closed.

It is observed further in connection with Figure 1 that the sweep multivibrator 111A generates a positive-going gating voltage 21 of a duration substantially equal to the time duration of the cathode beam sweep and such positive-going gating voltage is applied to the second mixer stage 23 to produce the wave form 25. This wave 25 comprises pulses of sweep frequency added to the longer azimuth and elevation gates which are developed in the first mixer stage 27 and shown also in Figure 4. This composite wave 25 is applied to the cathode ray grid 112G, bringing the tube up to the point of cut off during each sweep. By this expedient the cathode ray tube is conditioned for producing visual indication only during those times when video signals are being expected.

The range marks 40, 41, 43, 45, 47 and 49, shown in Figure 6, are developed by the range marks generator 41A (Fig. 1) in accordance with basic triggers applied to such stage from lead 10. The range marks developed in stage 41A are applied to the cathode 112C.

It is observed that the display shown in Figure 6 includes sectors defined by the so-called V-follower lines 50A, 51A, and 52A, 53A, which sectors are developed using the apparatus connected to the leads in Figure 1 marked Az. Servo Data No. 1, Az. Servo Data No. 2, and El. Servo Data No. 1 and El. Servo Data No. 2, all in accordance with the teachings in the above mentioned copending application of Landee et al., Serial No. 247,616, filed September 21, 1951.

Also Figure 6 shows the glidepath line 149A and runway course line 150A. These two lines are developed using features of the present invention.

*Cursor generator illustrated with reference to Figures 9 and 10*

While described previously in connection with Figures 1 and 5, the glidepath course line 149A (Figure 6) and runway course line 150A, are produced using the means and techniques described under this particular heading.

Figure 9:
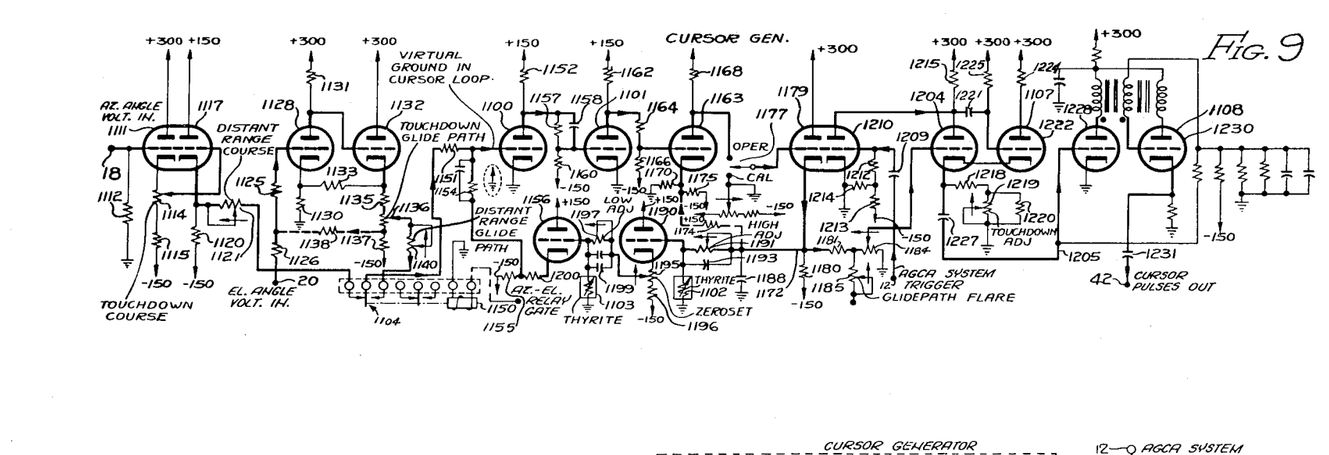
Figure 9 illustrates in schematic form the circuitry of a cursor generator useful in the production of the glidepath course line and runway course line, illustrated as such in Figure 6, such circuitry being illustrated in block diagram form in Figure 10.
Figure 10:
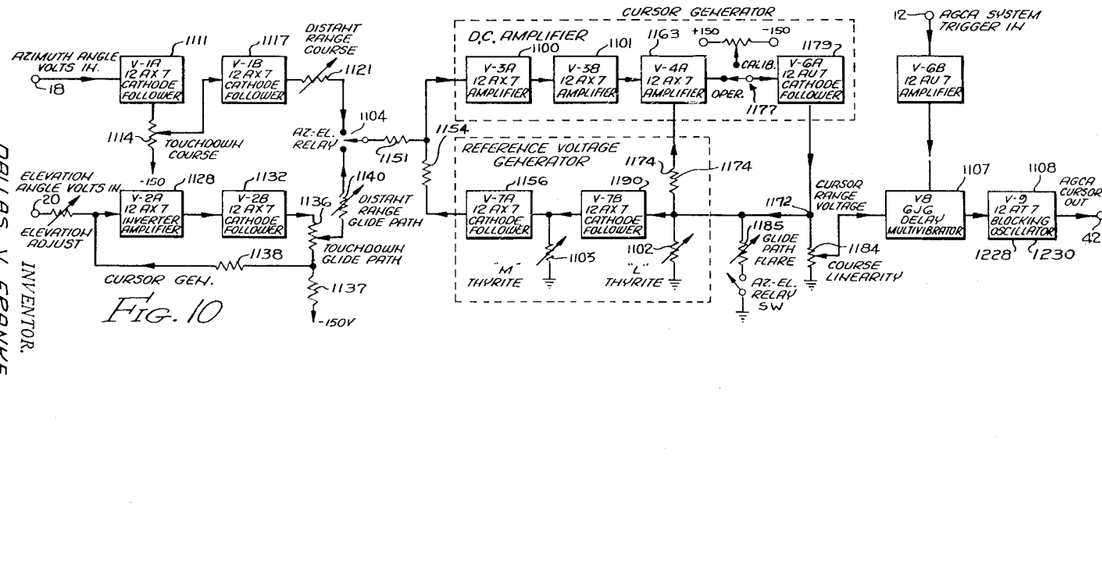
Figure 10 represents in block diagram form circuitry of the cursor generator illustrated in schematic form in Figure 9.

The cursor generator in Figures 9 and 10 includes a zero seeking loop using a D.-C. amplifier and two thyrite elements. The amplifier includes stages 1100, 1101 and the two thyrite resistors are the thyrite resistances 1102 and 1103. The output of the amplifier 1100, 1101 is returned through circuitry containing such thyrite elements, whose characteristics are imparted to the amplifier's output. This modified output is returned to the input of the first D.-C. amplifier 1100 in opposition to the input voltage, such input voltage comprising level shifted azimuth or elevation angle voltage, as the case may be, which is selected by single pole double throw relay switch 1104.

In seeking to achieve a zero input, the D.-C. amplifier 1100, 1101 provides a delay voltage for the multivibrator stage 1107. The characteristic of such delay multivibrator 1107 is such that it will produce an output meeting the conditions for the display of an "ideal" glidepath. The output of the delay multivibrator 1107 is applied to a blocking oscillator stage 1108 which, in turn, is coupled to the terminal 42, such terminal being connected to an intensity control electrode of the cathode ray tube 11 (Figure 6).

The output of the stage 1108 constitutes a series of pulses, the individual pulses being delayed in different amounts so as to produce an ideal reference glidepath and course line for an aircraft under AGCA control.

It is noted that portions of the circuitry described under this heading are similar to those used in glidepath computation circuitry of the AGCA computer, in that cursor pulse delay voltages are derived from level shifted azimuth and elevation angle voltage by the aforementioned electronic servo loop using the thyrite elements 1102, 1103.

The azimuth and angle elevation voltages are first level shifted and for that purpose, the azimuth angle voltage appearing on lead 18 is applied to the control grid of tube 1111, which is returned to ground through resistance 1112. The tube 1111 is a cathode follower and has its cathode connected to a negative 150 volt source through the "touch down course" resistance 1114 and resistance 1115. The tap on resistance 1114 is connected to the control grid of the cathode follower tube 1117 which has its cathode connected to a —150 volt source through resistance 1120. The cathode of tube 1117 is connected through the adjustable "distant range course" resistance 1121, to a stationary contact of switch 1104 to provide to such terminal a level shifted azimuth angle voltage.

The elevation angle voltage appearing on lead 20 is applied through resistances 1126 and 1127 to the control grid of the inverter amplifier tube 1128, which has its cathode returned to ground through resistance 1130 and which has its anode connected to a plus 300 volt source through resistance 1131.

The anode of tube 1128 is connected to the control grid of cathode follower tube 1132, which has its cathode connected to the cathode of tube 1128 through resistance 1133 to provide a regenerative connection. Also the cathode of tube 1132 is connected to a negative 150 volt source through serially connected resistance 1135, the "touchdown glidepath" resistance 1136 and resistance 1137. The junction point of resistances 1136, 1137 is connected through resistance 1138 to the junction point of resistances 1126, 1125. The adjustable tap on the "touchdown glidepath" resistance 1136 is connected through the adjustable "distant range glidepath" resistance 1140 to a stationary contact of switch 1104 to provide a level shifted elevation angle voltage on such contact.

The movable switch element of switch 1104 operated by periodically energizing the relay winding 1150 with az.-el. relay voltage serves to supply a level shifted azimuth or elevation angle voltage through resistance 1151 to the control grid of tube 1100. The control grid of tube 1100 constitutes a part of the input circuit to the servo loop which is now described in detail.

The cathode of tube 1100 is grounded and the anode of the same tube is connected to a +150 volt source through resistance 1152. Also, the control grid of tube 1100 is connected to a —150 volt source through the serially connected resistances 1154, 1155.

It is noted that the resistance 1155 is connected in the cathode circuit of the cathode follower tube 1156, so as to supply, in degenerative sense, a feedback voltage through resistance 1154 to the control grid of the input tube 1100.

The amplified voltage appearing on the anode of tube 1100 is transferred to the control grid of tube 1101 through resistance 1157 which is shunted by condenser 1158. The control grid of tube 1101 is connected to a —150 volt source through resistance 160 and the cathode of such tube is grounded. Resistance 1157 may be 2.2 megohms, condenser 1158 may be 22 microfarads, and resistance 1160 may be 3.3 megohms.

The anode of the amplifier tube 1101 is connected to a +150 volt source through resistance 1162 and such anode is conductively connected to the control grid of the amplifying tube 1163 through resistance 1164 so that the amplified voltage appearing on the anode of tube 1101 is applied to the control grid of tube 1163.

The control grid of tube 1163 is connected to a —150 volt source through resistance 1166. The anode of tube 1163 is connected to a +300 volt source through resistance 1168. The cathode of tube 1163 is connected to ground through resistance 1170 and is also connected to the so-called "cursor range voltage" lead 1172 through resistance 1174. Also, the cathode of tube 1163 is connected to a —150 volt source through resistance 1175.

The amplified voltage appearing on the anode of tube 1163 is connected through the single pole double throw switch 1177 (in its "operate" position) to the control grid of the cathode follower tube 1179 which has its cathode connected to the aforementioned lead 1172 and also to a —150 volt source through resistance 1180. This lead 1172 upon which the "cursor range voltage" appears is returned to ground through resistance 1181 and the so-called "course linearity" resistance 1184. The junction point of resistances 1181, 1184 has connected thereto one terminal of an adjustable so-called "glidepath flare" resistance 1185. The other terminal may have applied thereto, if desired, voltages varying in a predetermined manner for purposes of imparting a "flare" to the electronically produced glidepath, or such other terminal may be periodically grounded through a switch of the az.-el. relay 1150. The voltage thus developed on the lead 1172 is transferred in a degenerative sense to the control grid of the tube 1100 by the means which are now described in detail.

Lead 1172 is by-passed to ground through a one-tenth microfarad condenser 1188, which acts as a filtering condenser assuring the application of only substantially continuous voltages to the control grid of tube 1190 through the so-called "high adjust" resistance 1191 which is shunted by condenser 1193. Resistance 1191 may have a total resistance of 1 megohm and condenser 1193 may be 22 microfarads.

The "L" thyrite resistance 1102 is connected between the control grid of tube 1190 and ground so that the nonlinear characteristic of the thyrite produces a desired effect on the voltage applied from lead 1172 to such control grid.

The tube 1190 is a cathode follower and has its cathode connected to a —150 volt source through serially connected resistances 1195 and 1196. The resistance 1195 is termed a "thyrite zero set" resistance and has its adjustable tap connected through a so-called "low adjust" resistance 1197 to the control grid of the cathode follower tube 1156. The resistance 1197 is shunted by condenser 1199. The resistance 1197 may have a value of 100,000 ohms and condenser 1199 may be 122 microfarads.

The "M" thyrite resistance 1103 is connected between the control grid of the cathode follower tube 1156 and ground so that its nonlinear characteristics are imparted to the voltage applied to such control grid. The voltage thus developed on the cathode of tube 1156 is applied through resistance 1200 and 1154 to the control grid of tube 1100.

The loop described immediately above, which includes the feedback "course range voltage" lead 1172 operates such that the output voltage i. e., the voltage feedback to the control grid of tube 1100 seeks to balance itself against input potentials, i. e., elevation or azimuth angle voltages, as the case may be, applied through resistance 1151, thereby creating a virtual ground at the control grid of tube 1100, since the feedback path includes the thyrite resistances 1102 and 1103 which impart their characteristics upon the voltage and ultimately return to the control grid of tube 1100.

In seeking the aforementioned balance at the control grid of tube 1100, the voltage appearing on the lead 1172 varies in a predetermined manner as a function of time, and, of course, as a function of azimuth or elevation angle voltage as the case may be. Theoretical considerations involved in these functional variations of voltage on lead 1172 in relationship to the physical position of the glidepath and course line with respect to the geometry of an aircraft landing field and the disposition of radar equipment adjacent to such landing field, are more fully described in the copending application of Raymond B. Tasker et al., Serial No. 222,512.

The desired variation of voltage on lead 1172 is applied through the tap on resistance 1184 to the control grid of tube 1204, which constitutes an element of a range delay generator functioning to produce a voltage pulse on lead 1205, such pulse on lead 1205 being time spaced, i. e., delayed, with respect to the appearance of a trigger on the input lead 12, in accordance with the value of voltage appearing at trigger time, on lead 1172. The circuitry for developing such pulse on lead 1205 is now described in detail.

AGCA system triggers appearing on the input lead 12 are coupled through condenser 1209 to the control grid of tube 1210, which has its cathode grounded and its control grid connected to a —150 volt source through resistances 1212 and 1213, the junction point of resistances 1212, 1213 being returned to ground through resistance 1214, and the anode of tube 1210 is connected together with the anode of tube 1204 to a +300 volt source through voltage dropping resistance 1215.

The cathode of tube 1204 is returned to ground through serially connected resistance 1218 and the so-called "touchdown adjust" resistance 1219, such resistance 1219 being shunted by resistance 1220.

The amplified trigger pulse appearing on the anode of tube 1210 is applied through condenser 1221 to the control grid of tube 1222 which has its cathode interconnected to the cathode of tube 1204 and which has its anode connected to a +300 volt source through resistance 1224. The control grid of tube 1222 is connected to a +300 volt source through resistance 1125 so that normally, in its quiescent state tube 1222 is conducting heavily to cause the voltage on the cathode of tube 1204 to be relatively high during such quiescent period of tube 1222.

However, upon the application of a negative pulse from the anode of tube 1210, the flow of space current through tube 1222 is greatly diminished. The resulting pulse appearing on lead 1205, which is delayed in an amount depending upon the voltage of lead 1172, is applied to the pulse generator circuitry 1108. For that purpose, the cathode of tube 1204 is connected through condenser 1227 to the control grid of the trigger tube 1228 of the blocking oscillator stage 1108. This circuitry of the blocking oscillator stage is conventional and for that reason need not be described in detail, but functions to produce sharpened pulses at the cathode of the output tube 1230, such sharpened pulses being applied through condenser 1231 to the cursor output terminal 42.

Thus, the thyrite modified feedback voltage is applied as a range delay control potential causing the blocking of the oscillator blocking stage 1108 to occur at the desired range delay for the particular angular position specified.

These pulses appearing on the terminal 42 are applied to an intensity control electrode of the cathode ray tube indicator in the manner mentioned above, and such pulses serve to produce a series of visible dots, all of which appear in a straight line on the face of the cathode ray tube. The particular line which is formed during the so-called azimuth scanning period appears as the runway course line 150A; and subsequently during the elevation scan period the line thus formed is the glide path course line 149A in Figure 6. Both of these lines 149A and 150A appear visible simultaneously because of the high rate at which such pulses are developed, the characteristic of the cathode ray tube viewing screen, and the persistency of vision of the human eye.

The line 149A is produced during the azimuth scanning period in the interval indicated by the heavy lines 61 in Figure 2, and similarly, the course line 150A is produced later during the azimuth scanning period during the intervals indicated by the heavy lines 63 in Figure 2. The cursor circuitry illustrated in Figures 9 and 10 is connected to receive azimuth angle voltage on terminal 18 and the elevation angle voltage on lead 20, such voltages being of the character illustrated in Figure 2, for modification as explained above. However, only one of such modified voltages is effective at any one particular time because of the selective nature of the single pole relay switch 1104 that is operated by the so-called az.-el. relay 1150. This relay 1150 is energized with the az.-el. relay gate voltage illustrated in Figure 4 and developed in the apparatus shown in Figure 1 as described above. Thus, during the azimuth scanning period, i. e., during those intervals indicated by the heavy lines 63 in Figure 3 the modified azimuth angle voltage is applied through the movable arm of the switch 1104 to the amplifier stage 1100. Similarly, during the elevation period the modified elevation angle voltage is applied to the amplifier 1100. Thus, due to the selective nature of the relay switch 1104, cursor pulses appear on lead 42, for developing the glide path course line 149A (Figure 6) during the elevation scanning period and to produce the runway course line 150A during the azimuth scanning period.

It is noted that neither the course line 149A nor the course line 150A in Figure 6 pass through the origin O₁ or O₂, respectively, of the elevation and azimuth displays. The elevation display, as described previously, is developed by a series of polar sweeps that originate at the origin O₁ during the elevation scanning period; and similarly the azimuth display is developed by a series of sweeps emanating from the origin O₂ during the azimuth scanning period. The particular problems solved by the present invention would be greatly simplified if such course lines 149A and 150A, each corresponded to a radial sweep which passes through the origins O₁ and O₂, since in such instances, it would be necessary only to intensify a particular sweep to define the course lines. However, such lines 149A and 150A do not pass through the origin of sweeps for a very practical reason, namely, that the radar apparatus, for obvious safety reasons and operations, cannot be located precisely at the point of touchdown of the aircraft. In other words, it is necessary that the radar apparatus be located adjacent the landing strip, and for that reason, the instant problem, solved by the present invention, arises.

The lines 149A and 150A are, in fact, produced in visible form by intensifying a predetermined portion of successive sweeps, each emanating from the origin O₁ or O₂, as the case may be. Any point on the lines 149A and 150A may, of course, be defined in terms of a polar coordinate, i. e., by a coordinate specifying angle and a second coordinate specifying distance or range. The first coordinate, namely, that coordinate specifying angle, is developed using the apparatus illustrated in Figure 1 and the second coordinate specifying distance or range is developed in the cursor generator described in connection with Figures 9 and 10. In other words, the cursor pulses which are developed on the output terminal 42 are so timed as to produce intensification of predetermined portions of successive sweeps. There is one cursor pulse per cathode ray beam sweep since such cursor pulses are derived from the system trigger applied to terminal 12. However, each cursor pulse is delayed a predetermined time interval with respect to such system trigger. The amount of the delay which is varied in a predetermined fashion, of course, corresponds to distance, since it is appreciated that the speed at which the cathode beam travels during a sweep multiplied by time is equal to distance. Also, since the speed of each sweep is the same, the terms time delay and distance (or range) may be considered synonymous.

Figure 8:
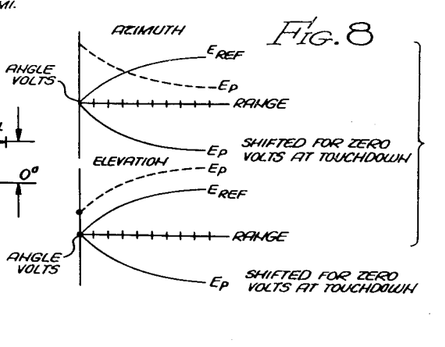
Figure 8 is useful in explaining the manner in which the azimuth and elevation beam angle voltages are modified as a function of range for purposes of comparison with a reference voltage in the zero seeking loop.

Thus, the term range may be considered synonymous to time delay for the present purposes. The cursor generator thus functions generally to produce a pulse at the output terminal 42 which is delayed in time an amount determined by the particular instantaneous value of the angle voltage and such output pulse may be considered to be representative of the range of a corresponding point on the glide path or course line, as the case may be, for that particular instantaneous value of angle voltage. The direct current voltage which is developed in the zero seeking loop and appearing on lead 1172 has a magnitude which determines the amount by which a particular pulse developed on terminal 42 is delayed, i. e., the distance or range coordinate is determined by the magnitude of the voltage on lead 1172, and hence, such voltage on lead 72 is termed the cursor range voltage to ascribe its general function. This cursor range voltage is developed as described above, automatically and in a continuous manner when and as the angle voltage changes in operation of the zero seeking loop in which, at all times, the net voltage at the input of the D.-C. amplifier 1100 is substantially equal to zero. The functioning of the zero seeking loop is indicated in Figure 8 wherein the voltage $E_p$ is the level shifted azimuth or elevation angle voltage as the case may be. In either instance, the level shifted angle voltage as represented by $E_p$ has a value equal to zero for the point on the corresponding glide path or course line which corresponds to the touchdown point. The voltages $F_p$ shown in full lines have progressively larger values (negative as shown in Figure 8) as the range increases.

The voltage $E_{ref.}$ shown in Figure 8 represents the output of the reference voltage generator illustrated as such in Figure 10 and such voltage, due to the operation of the zero seeking loop, has the same amplitude for a particular value of range, but with opposite polarity such that the net voltage at any one particular time (at any one particular range) is equal to zero. In effecting such a condition, the cursor range voltage is developed on the lead 1172 with the magnitude thereof being variable to effect the above condition and such variable cursor range voltage determines the amount by which a particular pulse on lead 42 is delayed.

While the particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In an arrangement of the character described, means producing and scanning an antenna beam through space, means deriving a voltage, the instantaneous magnitude of which is representative of the instantaneous angular position of the antenna beam, said antenna beam comprising energy pulsed at a predetermined rate, a zero seeking loop comprising an amplifier stage having an input terminal and an output terminal for amplifying said voltage, means coupling said voltage deriving means to the input terminal of said amplifier stage, a degenerative feedback connection extending from the output terminal of said amplifier to the input terminal of said amplifier rendering the net voltage of said input terminal equal to zero, said feedback connection including non-linear circuit elements the voltage across said circuit elements decreasing with increase in output voltage applied thereto, means deriving a voltage from said feedback connection which is representative of an ideal range of an object in said space correlated with said angular position voltage, a delay multivibrator for generating pulses which are delayed in time in amount proportional to said range voltage, and means operating said delay multivibrator at said predetermined rate.

2. In an arrangement of the character described, means producing and scanning an antenna beam through space, said antenna beam comprising energy pulsed at a predetermined rate, means deriving a voltage, the instantaneous magnitude of which is representative of the angular position of said antenna beam in space, an amplifier stage having an input terminal and an output terminal for amplifying said voltage, means coupling said voltage deriving means to the input terminal of said amplifier stage, a degenerative feedback connection extending from the output terminal of said amplifier stage to the input of said amplifier stage functioning to maintain the input of said amplifier stage at a net zero level, said feedback connection including non-linear parameters, the voltage across said parameters decreasing with increase in output voltage applied thereto, means deriving from said feedback connection a range voltage, the magnitude of which is representative of an ideal range of an object in said space correlated with said angular position voltage, delay means recurrently operated at said predetermined rate and sensitive to the magnitude of said range voltage for developing pulses which are delayed in time in an amount depending upon the magnitude of said range voltage.

3. In an arrangement of the character described, a source of azimuth angle volts, the instantaneous magnitude of which is representative of the angular position of an azimuth antenna beam in space, a source of elevation angle volts, the instantaneous magnitude of which is representative of the angular position of an elevation antenna beam in space, a single pole double throw switch having one of its stationary contacts connected to said source of azimuth angle volts, means coupled to said source of elevation angle voltage for inverting the elevation angle voltage, means applying inverted elevation angle voltage to the other stationary contact of said switch, the movable contact of said single pole double throw switch being coupled to the input terminal of a D. C. amplifier, means applying the output of said D. C. amplifier to a first non-linear circuit element, the voltage across said circuit element decreasing with increase in output voltage applied thereto, means coupling the voltage developed across said non-linear circuit element to the input of said D. C. amplifier in a degenerative sense such that the net voltage applied to the input terminal of said D. C. amplifier is substantially zero, recurrently operated delay means coupled to said non-linear circuit element and sensitive to the magnitude of voltage developed across said non-linear circuit element for developing a series of pulses, each of which is delayed in time, in amount proportional to the voltage developed across said non-linear circuit element.

4. In an arrangement of the character described, a source of antenna beam angle voltage, the instantaneous magnitude of which is representative of the angular position of an antenna beam in space, said antenna beam comprising energy pulsed at a predetermined rate, a D. C. amplifier having its input terminal coupled to said source, a degenerative feedback connection extending from the output of said amplifier to the input terminal of said amplifier functioning to maintain the net voltage applied to said input terminal at a substantially zero value, said feedback connection including a non-linear circuit element the voltage across which decreases with increased amplifier output voltage applied to the same, the last mentioned voltage being representative of an ideal range of an object in said space correlated with said angle voltage, delay means coupled to said non-linear circuit element and producing pulses delayed in time, in accordance with the magnitude of voltage developed across said non-linear circuit element.

5. In an arrangement of the character described, a source of antenna beam angle voltage, the instantaneous magnitude of which represents the angular position of an antenna beam in space, an amplifier having an input terminal and an output terminal, means coupling said input terminal to said source, a degenerative feedback connection extending from said output terminal to said input terminal and functioning to maintain the net voltage applied to said input terminal at a substantially zero value, delay means coupled to said amplifying means and functioning to produce a series of pulses, each delayed in an amount measured by the magnitude of a voltage developed in said feedback connection, the last mentioned voltage being representative of an ideal range of an object in said space correlated with said angle voltage.

6. In an arrangement of the character described, a source of voltage, the instantaneous magnitude of which represents a particular condition, a zero seeking loop connected to said source, said loop including a feedback connection with a non-linear circuit element therein, the current through which increases with increased voltage applied thereto, delay means coupled to said non-linear circuit element and functioning to produce a series of pulses each delayed in time in an amount measured by the magnitude of the voltage developed across said non-linear circuit element.

References Cited in the file of this patent

UNITED STATES PATENTS

| | | |
|---|---|---|
| 2,513,962 | Patterson | July 4, 1950 |
| 2,585,855 | Sherwin et al. | Feb. 12, 1952 |
| 2,629,827 | Eckert | Feb. 24, 1953 |